(12) United States Patent
Nishi et al.

(10) Patent No.: US 8,579,070 B2
(45) Date of Patent: Nov. 12, 2013

(54) WORK VEHICLE

(75) Inventors: Keishiro Nishi, Sakai (JP); Akiyoshi Ono, Izumi (JP)

(73) Assignee: Kubota Corporation, Osaka (JP)

( * ) Notice: Subject to any disclaimer, the term of this patent is extended or adjusted under 35 U.S.C. 154(b) by 164 days.

(21) Appl. No.: 13/051,674

(22) Filed: Mar. 18, 2011

(65) Prior Publication Data

US 2012/0073895 A1 Mar. 29, 2012

(30) Foreign Application Priority Data

Sep. 29, 2010 (JP) ................. 2010-218905

(51) Int. Cl.
*B60K 23/00* (2006.01)
*G05G 1/01* (2008.04)

(52) U.S. Cl.
USPC ................. 180/336; 74/469; 74/491

(58) Field of Classification Search
USPC ............ 180/336, 315; 74/469, 491, 516, 519
See application file for complete search history.

(56) References Cited

U.S. PATENT DOCUMENTS

| | | |
|---|---|---|
| 2003/0184123 A1 | 10/2003 | Amamiya et al. |
| 2005/0139034 A1 | 6/2005 | Komine et al. |
| 2007/0295551 A1 | 12/2007 | Proud et al. |

FOREIGN PATENT DOCUMENTS

| | | | | |
|---|---|---|---|---|
| JP | 54-53422 | * | 4/1979 | ................. 180/336 |
| JP | 59-40918 U1 | | 3/1984 | |
| JP | 2002-264849 A | | 9/2002 | |
| JP | 2008-017803 A | | 1/2008 | |
| JP | 2008254534 A | | 10/2008 | |
| KR | 100645404 B1 | | 11/2006 | |

OTHER PUBLICATIONS

Japanese Office Action dated Feb. 14, 2013 in corresponding Japanese priority application No. 2010-218905.
Korean Office Action dated Dec. 5, 2012.

* cited by examiner

*Primary Examiner* — Drew Brown
*Assistant Examiner* — Timothy Wilhelm
(74) *Attorney, Agent, or Firm* — The Webb Law Firm

(57) ABSTRACT

A speed changer lever and a lift lever are supported to a lever supporting structure that extends from the front end of an armrest disposed laterally of a driver's eat to the forward side of the vehicle body. A speed changer lever guide face portion is provided at a transversely inner portion of an upwardly oriented face of the lever supporting structure. A lift lever guide face portion is provided at a transversely outer portion of the upwardly oriented face of the ever supporting structure. The lift lever guide face portion is set at a disposing height lower than the speed changer lever guide face portion. An upper end of the lift lever is set at a disposing height lower than the upper end of the speed changer lever. A speed changer lever guide groove and a lift lever guide groove are disposed parallel to each other.

3 Claims, 11 Drawing Sheets

WORK VEHICLE

FIELD OF THE INVENTION

The present invention relates to a work vehicle including an armrest disposed laterally of a driver's seat and a lever supporting structure extending from the front end of the armrest to the forward side of the vehicle body.

DESCRIPTION OF THE RELATED ART

As an example of the work vehicle of the above-noted type, a work vehicle is known form e.g. JP 2008-254534A. The work vehicle disclosed in JP 2008-254534A includes a base portion of a right armrest as the "armrest" and an extension portion and a branch portion of the right armrest as the "lever supporting structure". A main speed changer lever is provided in the extension portion of the right armrest and a utility implement position lever provided in the branch portion.

If there is provided the lever supporting structure extending from the armrest and if a speed changer lever for speed changing operations and a lift lever for lifting up/down an implement are provided in this lever supporting structure, a driver, even if kept seated at a driver's seat, can readily reach the speed changer lever and the lift lever, so that a traveling speed changing operation and a lifting up/down operation of the utility implement can be readily performed. However, if the speed changer lever and the lift lever are provided in the lever supporting structure, this lever supporting structure tended to be large-sized.

Namely, in order to cause the lift lever not to hinder an operation of the speed changer lever when this latter lever is to be operated, there is a need for disposing the speed changer lever and the lift lever sufficiently apart from each other in the transverse direction of the vehicle body. So, the size of the vehicle body in the transverse direction was enlarged due to the lever supporting structure.

The object of the present invention is to provide a work vehicle that allows readiness of operations of the speed changer lever and the lift lever within easy reach of the operator's hand even if the operator keeps seated at the driver's seat and that yet allows the lever supporting structure to be formed compact.

SUMMARY OF THE INVENTION

For accomplishing the above-noted object, according to the present invention, a work vehicle having a self-propelled vehicle body to which an implement is connectable, the work vehicle comprising:
   a driver's seat;
   an armrest disposed laterally of the driver's seat;
   a lever supporting structure extending from a front end of the armrest to a forward side of the vehicle body;
   a speed changer lever for a traveling speed changing operation of the self-propelled vehicle body, the speed changer lever being supported to the lever supporting structure to be pivotable back and forth;
   a lift lever for lifting up/down the implement, the lift lever being supported to the lever supporting structure to be pivotable back and forth;
   a speed changer lever guide face portion provided at a transversely inner portion of an upwardly oriented face of said lever supporting structure, said speed changer lever guide face portion having a speed changer lever guide groove for the speed changer lever; and
   a lift lever guide face portion provided at a transversely outer portion of the upwardly oriented face of said lever supporting structure, said speed lift lever guide face portion having a lift lever guide groove for the lift lever;
   wherein:
   said lift lever guide face portion is set at a disposing height lower than said speed changer lever guide face portion;
   an upper end of said lift lever is set at a disposing height lower than an upper end of said speed changer lever; and
   said speed changer lever guide groove and said lift lever guide groove are disposed parallel to each other.

With the above-described construction, the speed changer lever and the lift lever are supported to the lever supporting structure that extends from the front end of the armrest to the forward side of the vehicle body. So, an operator, even if kept seated at the driver's seat, can readily reach the speed changer lever and the lift lever.

Further, a speed changer lever guide face portion having a speed changer lever guide groove extending along the fore/aft direction of the vehicle body is provided at a transversely inner portion of an upwardly oriented face of the lever supporting structure, and a lift lever guide face portion having a lift lever guide groove extending along the fore/aft direction of the vehicle body is provided at a transversely outer portion of the upwardly oriented face of the lever supporting structure. And, the lift lever guide face portion is set at a disposing height lower than the speed changer lever guide face portion, an upper end of the lift lever is set at a disposing height lower than the upper end of the speed changer lever; and the speed changer lever guide groove and the lift lever guide groove are disposed parallel to each other. With these arrangements, even if the speed changer lever and the lift lever are disposed relatively close to each other in the transverse direction of the vehicle body, when an operator operates the lift lever, the operator can place his/her hand operating the lift lever on the more transversely outer side of the vehicle body than the speed changer lever, so that the operator can operate the lift lever without much obstruction from the speed changer lever. And, when the operator operates the speed changer lever, even if his/her hand operating this speed changer lever is located on the transversely outer side of the speed changer lever, the operator can operate this speed changer lever with placing his/her hand operating the speed changer lever upwardly of this speed changer lever comfortably so as to be free from obstruction from the lift lever.

Therefore, even if the operator keeps seated at the driver's seat, the operator can readily reach his/her hand to the speed changer lever and the lift lever, and further, even whichever of the speed changer lever and the lift lever is to be operated, obstruction by the lever not be operated can be avoided easily, so that a traveling speed changing operation or a lifting up/down operation of the utility implement can be performed easily. Moreover, by forming the lever supporting structure compact in the transverse direction of the vehicle body so as to support the speed changer lever and the lift lever close to each other in the direction of the vehicle body, the driver's section can be simplified.

According to one preferred embodiment of the invention, the speed changer lever guide face portion is set at a lower disposing height than an upper face of the armrest. This provides an additional advantage in the following respect.

If the speed changer guide face were set at a higher disposing height than the upper face of the armrest, when the speed changer lever and the lift lever are to be operated, if the operator keeps his/her elbow on the armrest, the wrist will be bent to orient the end of the hand upward, so that a load tends to be applied to the hand.

On the other hand, with the above-described construction of the invention, since the speed changer lever guide face portion is set at a lower disposing height than the upper face of the armrest, even if the wrist is bent to orient the end of the hand upward, the amount of this bending can be small. Or, the arrangement can even allow the wrist not to be bent to orient the end of the hand upward at all or causes the wrist to be bent in the opposite direction to orient the end of the hand downward. So, load will hardly be applied to the hand, hence, the operator can readily pivotally operate the speed changer lever to the forward side in particular.

Therefore, even if the operator keeps his/her elbow placed on the armrest, the operator can readily operate the speed changer lever to the forward side and the armrest can be used with ease.

According to one preferred embodiment of the present invention, a guard body for the speed changer lever is provided on a transversely inner side of an operational pathway of the speed changer lever. This provides an additional advantage in the following respect.

With this construction, even when the lever supporting structure can be more readily contacted by an operator's foot or the like who is getting seated at the driver's seat or who is leaving the driver's seat, as the result of the mutually closer disposing of the lever supporting structure and the driver's seat, the guard body can restrict occurrence of such contact between the operator's body and the speed changer lever.

Therefore, even when the speed changer lever and the lift lever are pivotally operated to the forward side of the vehicle body so that the speed changer lever and the lift lever are moved forwardly relative to the driver's seat, the lever supporting structure can be disposed as close as possible to the driver's seat for placing the speed changer lever and the lift lever at readily operable positions, the operations of the speed changer lever and the lift lever can be readily performed.

Further and other features and advantages of the present invention will become apparent upon reading the following detailed description with reference to the accompanying drawings.

Incidentally, unless indicated explicitly otherwise, in the following discussion, the direction of the vehicle body traveling straight forward (forward traveling) will be used as a reference and this direction will be referred to as the "fore/aft direction", and the horizontal direction normal to this fore/aft direction will be referred to as the right/left direction (or "transverse direction"), and the direction normal to both the fore/aft direction and the right/left direction will be referred to as the vertical direction.

BRIEF DESCRIPTION OF THE DRAWINGS

FIGS. 1 through 11 are drawings showing a work vehicle according to a first embodiment of the invention; in which, FIG. 1 is a right side view showing the work vehicle in its entirety, FIG. 2 is a plan view showing the work vehicle in its entirety, FIG. 3 is a right side view showing a control apparatus, FIG. 4 is a perspective view showing the control apparatus, FIG. 5 is a plan view showing the control apparatus, FIG. 6 is a section view taken along VI-VI line in FIG. 5, FIG. 7 is a right side view showing constructions of an armrest and a lever supporting structure, FIG. 8 is a plan view showing constructions of the armrest and the lever supporting structure, FIG. 9 is a left side view showing the construction of the lever supporting structure, FIG. 10 is a skeleton view showing a transmission unit, and FIG. 11 is block diagram showing a control system for speed changing control and lifting control, and FIGS. 12 and 13 are drawings related to a work vehicle according to a second embodiment of the present invention; in which, FIG. 12 is a plan view showing a control apparatus in its entirety, and FIG. 13 is a right side view showing the control apparatus.

DESCRIPTION OF THE PREFERRED EMBODIMENTS

Next, preferred embodiments of the present invention will be described with reference to the accompanying drawings.
[First Embodiment]

Figure 1:
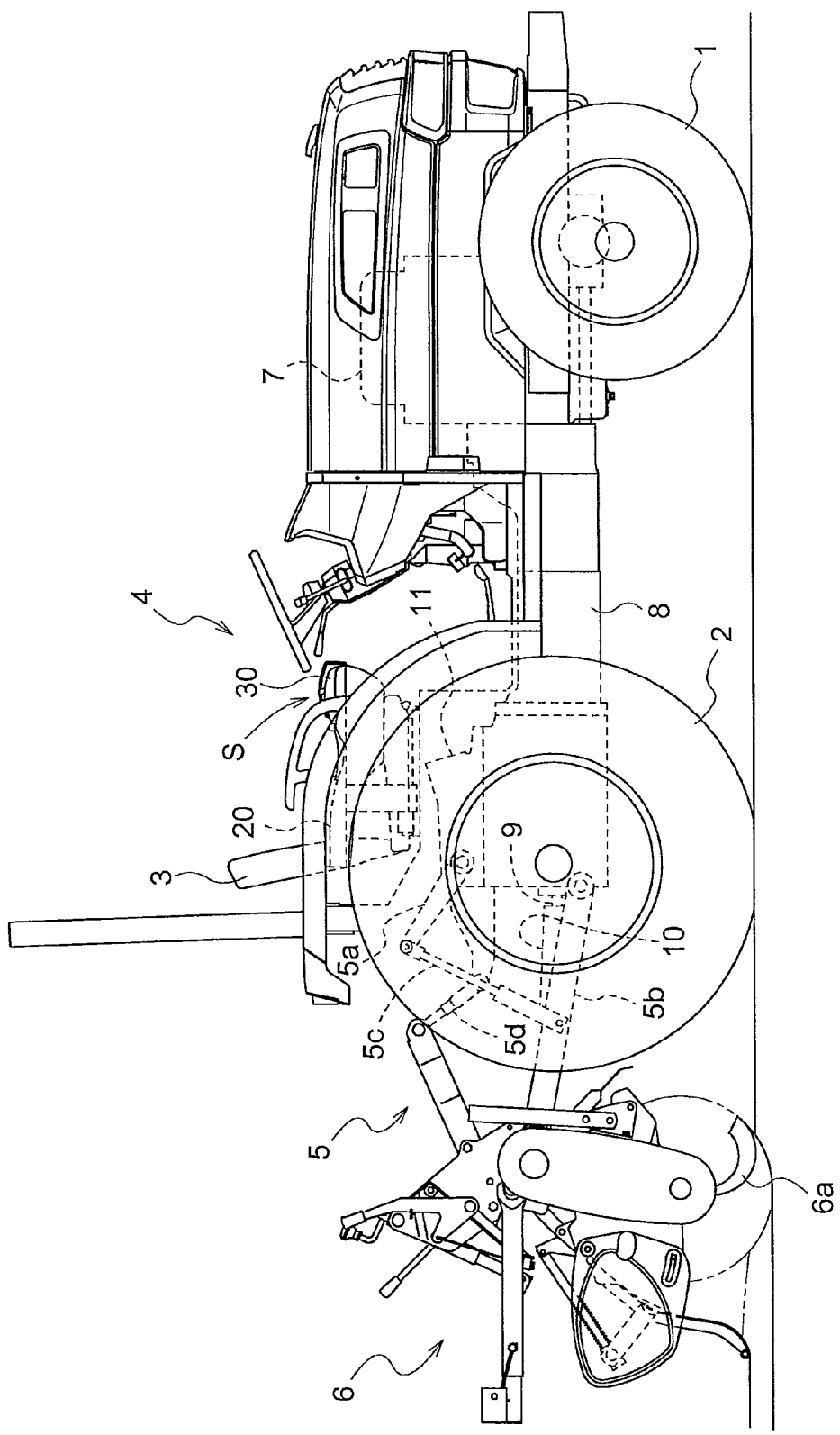
Figure 2:
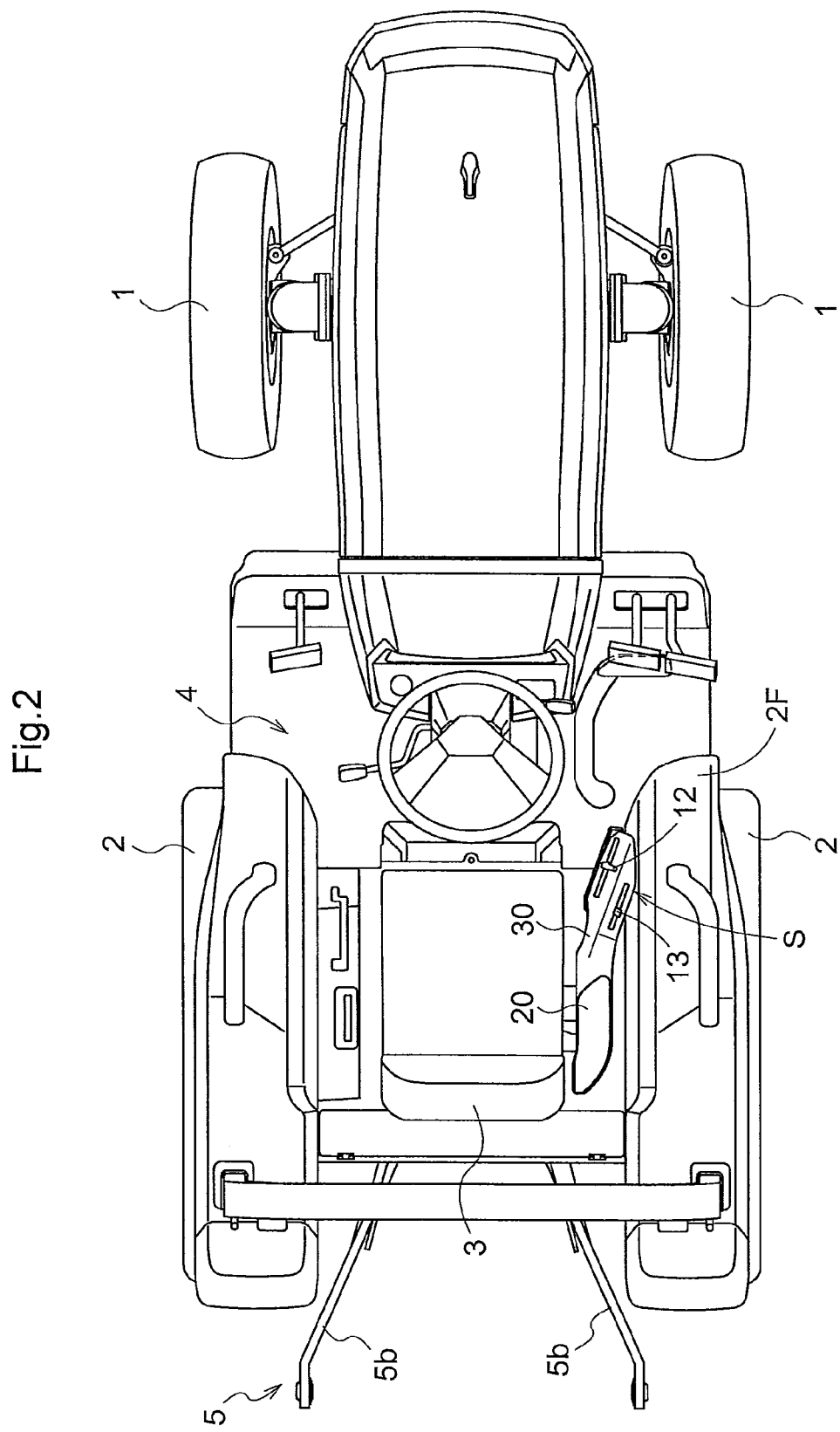

FIG. 1 is a right side view showing the work vehicle in its entirety, and FIG. 2 is a plan view showing the work vehicle in its entirety. As shown in these figures, the work vehicle according to the instant embodiment includes a self-propelled vehicle body configured to be self-propelled by means of a pair of right/left steerable and drivable front wheels 1, 1, a pair of right/left drivable rear wheels 2, 2 and having a driver's section 4 provided at a rear portion of the vehicle body and having a driver's seat 3, and a rotary cultivator unit 6 as an example of utility implement connected to the rear portion of the body of this self-propelled vehicle via a link mechanism 5.

The self-propelled vehicle includes an engine 7 mounted at a front portion of the vehicle body, a power takeoff shaft (PTO) shaft 9 projecting rearward from the rear portion of a transmission case 8 constituting a vehicle body frame, so that a drive force outputted from the engine 7 is transmitted via the PTO shaft 9 and a rotary shaft 10 to the rotary cultivator unit 6.

The link mechanism 5 includes a pair of right/left lift arms 5a, 5a connected to the rear portion of the transmission case 8 to be vertically pivotable relative thereto, a pair of right/left lower links 5b, 5b interconnecting a lower portion of the transmission case 8 and a frame of the rotary cultivator unit 6, a pair of right/left lift rods 5c, 5c connecting the pair of right/left lift arms 5a, 5a to the pair of right/left lower links 5b, 5b, respectively, and a top link 5d interconnecting the transmission case 8 to the frame of the rotary cultivator unit 6.

With the above-described link mechanism 5 in operation, the pair of right/left lift arms 5a, 5a are pivotally operated by a lift cylinder 11 comprised of a hydraulic cylinder which is provided inside the transmission case 8 with the pair of right/left lift arms 5a, 5a being operably coupled with a rotational support shaft operably connected to the transmission case 8. Whereby, the link mechanism 5 is pivoted vertically relative to the transmission case 8, so that the rotary cultivator unit 6 is lifted up/down between a lowered operational condition where a cultivator rotor 6a is placed on the ground surface and a raised inoperative condition where the cultivator rotor 6a is raised high off the ground surface.

That is, the work vehicle cultivates the field with the rotatably driven cultivator rotor 6a while the self-propelled vehicle body is caused to travel with placing the rotary cultivator unit 6 under the lowered operative condition.

The transmission case 8 accommodates therein a transmission unit D (see FIG. 10) for speed-changing the drive force outputted from the engine 7 and transmitting this speed-changed drive force to the front wheels 1 and the rear wheels 2. Further, in the driver's section 4, there is provided a control apparatus S for speed-changing the transmission unit D for performing a speed-changing operation of the traveling speed of the self-propelled vehicle and also for expanding/contracting the lift cylinder 11 for performing a lifting up/down operation of the rotary cultivator unit 6.

Next, the control apparatus S will be described in greater details.

Figure 3:
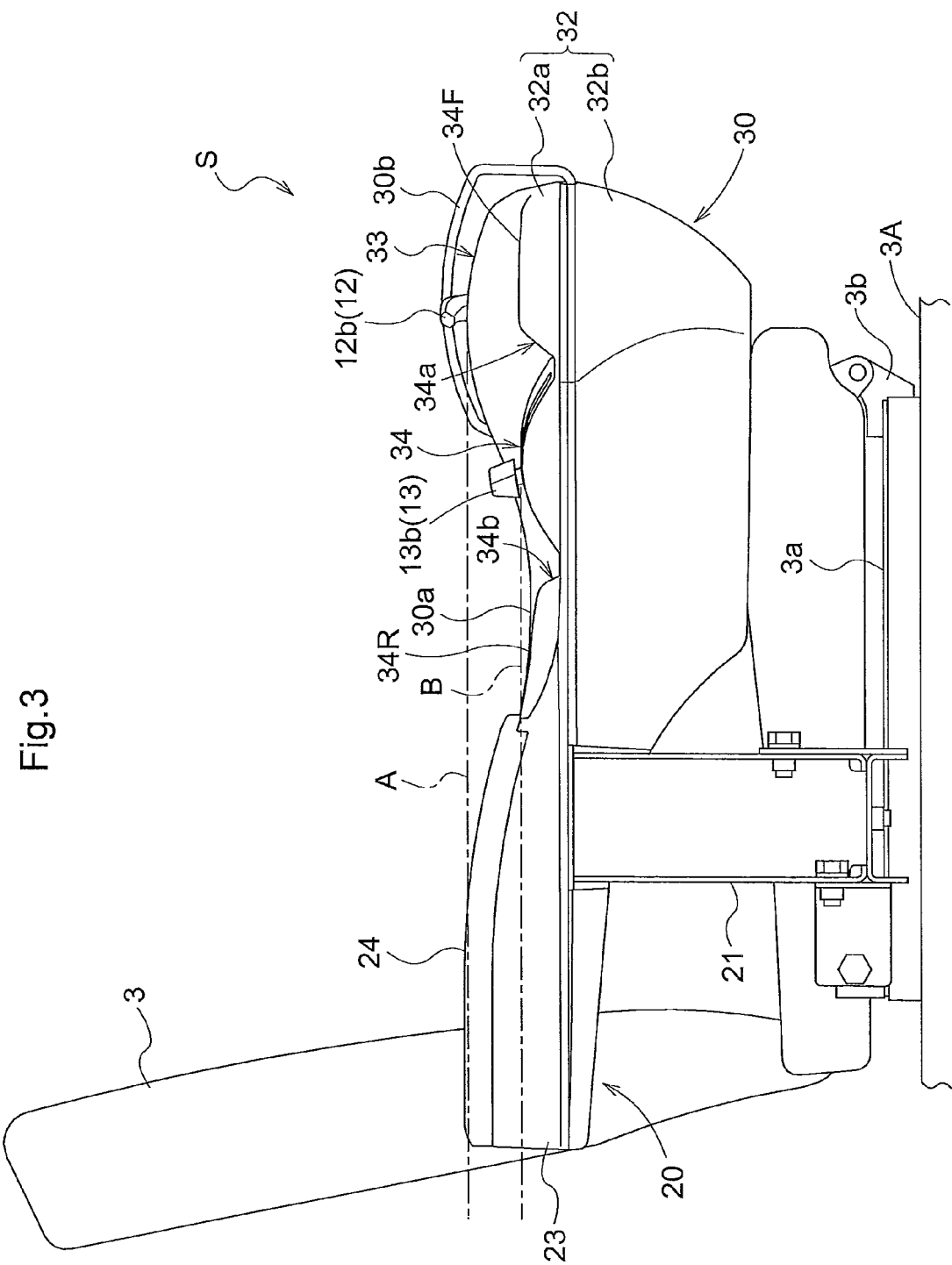
Figure 4:
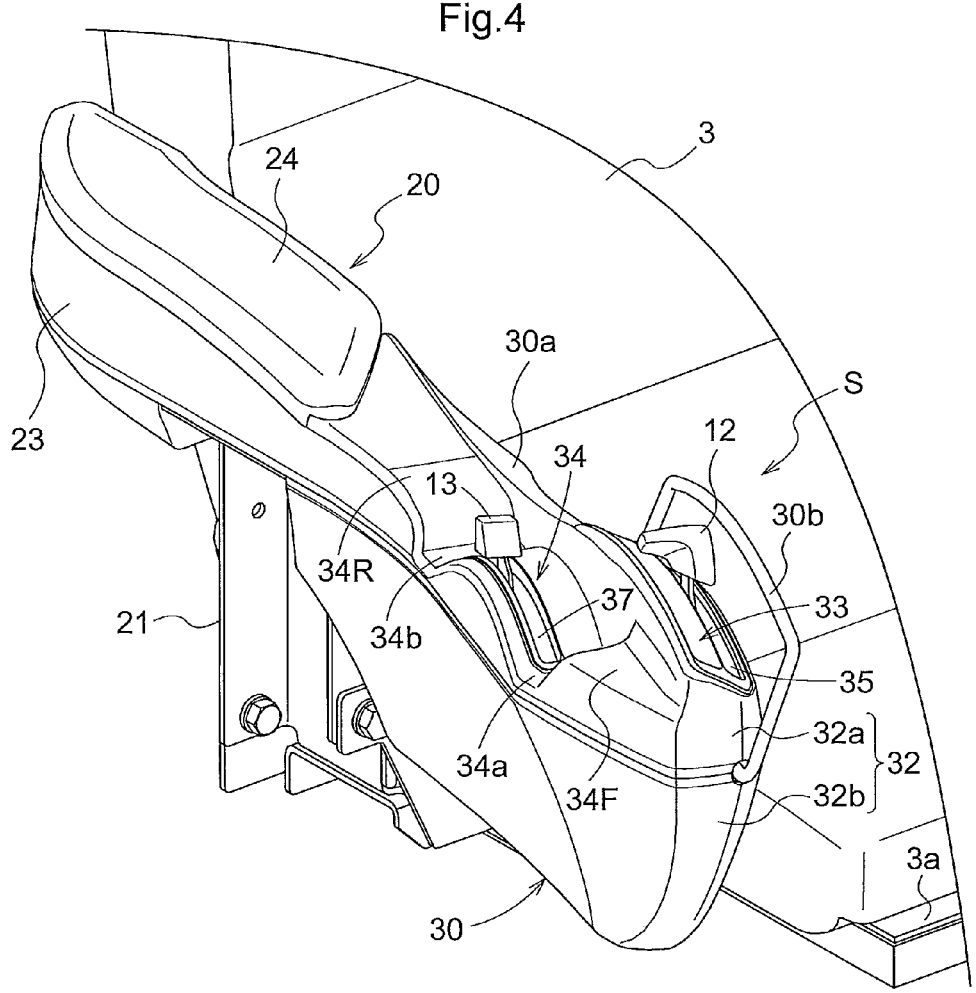
Figure 5:
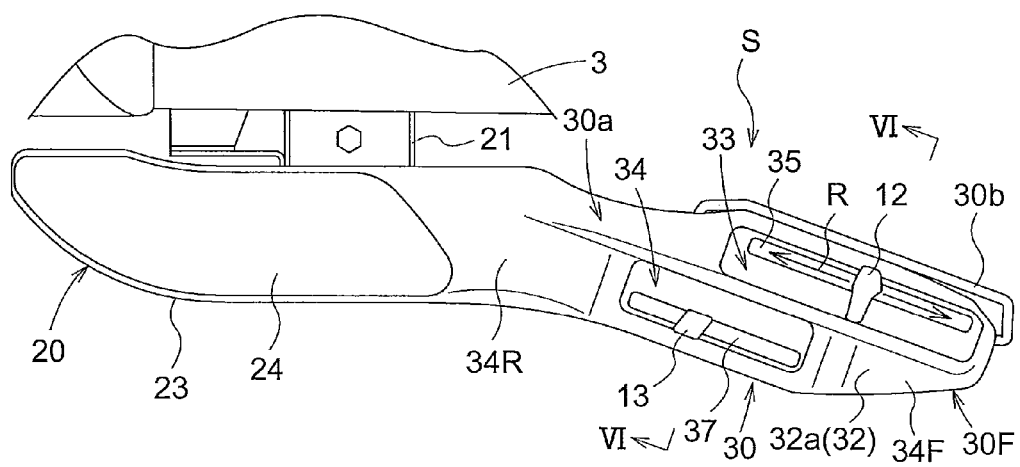
Figure 6:
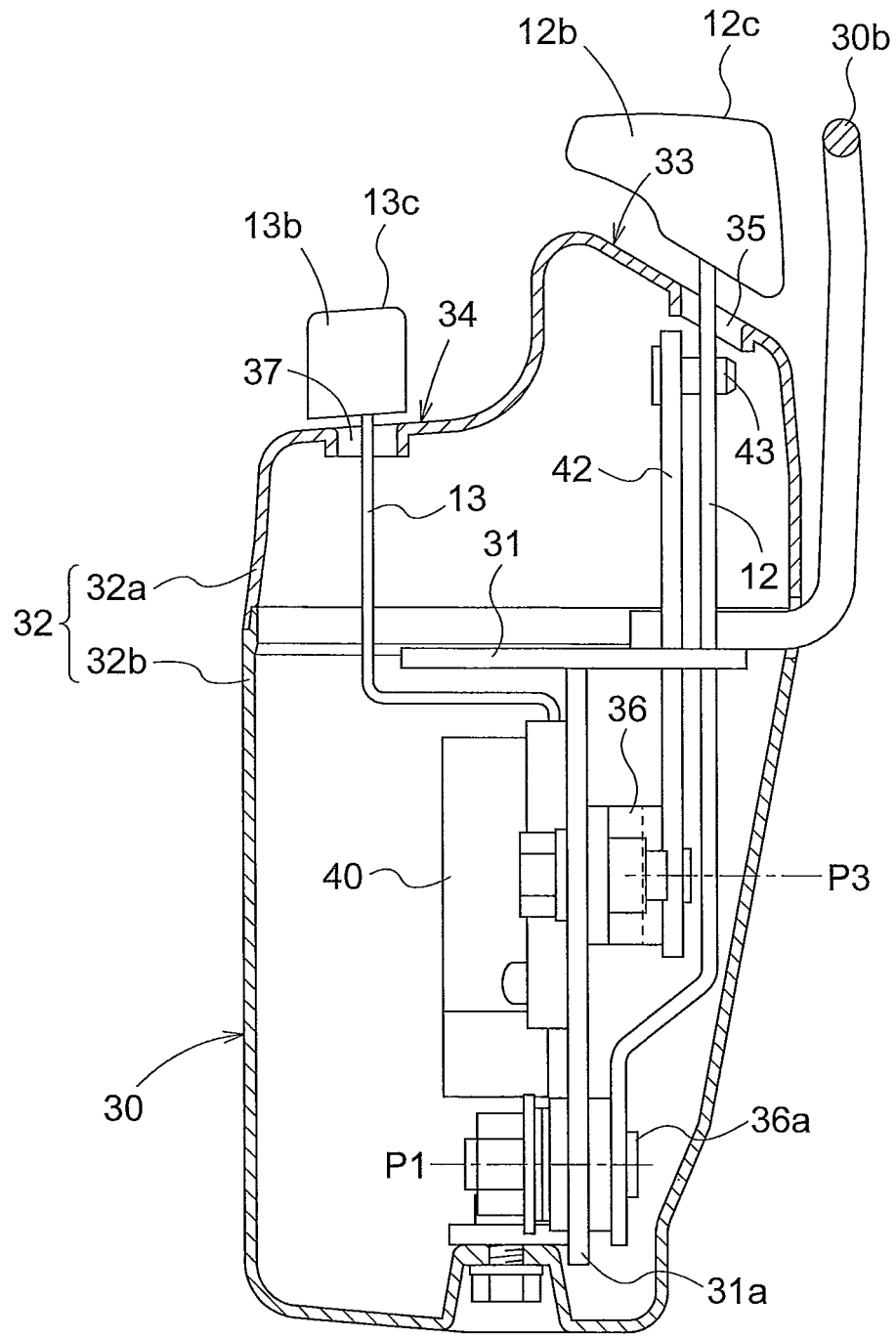

FIG. 3 is a right side view showing the control apparatus S. FIG. 4 is a perspective view showing the control apparatus S. FIG. 5 is a plan view showing the control apparatus S. FIG. 6 is a section view taken along VI-VI line in FIG. 5. As shown in these figures, the control apparatus S includes a lever supporting structure 30 provided in the driver's seat 3 on the right side thereof and extending to the forward side of the vehicle body from a front end portion of an armrest 20 disposed on the right side of the driver's seat 3, and a speed changer lever 12 and a lift lever 13 that are supported to the lever supporting structure 30 in distribution along the transverse direction of the vehicle body.

Figure 7:
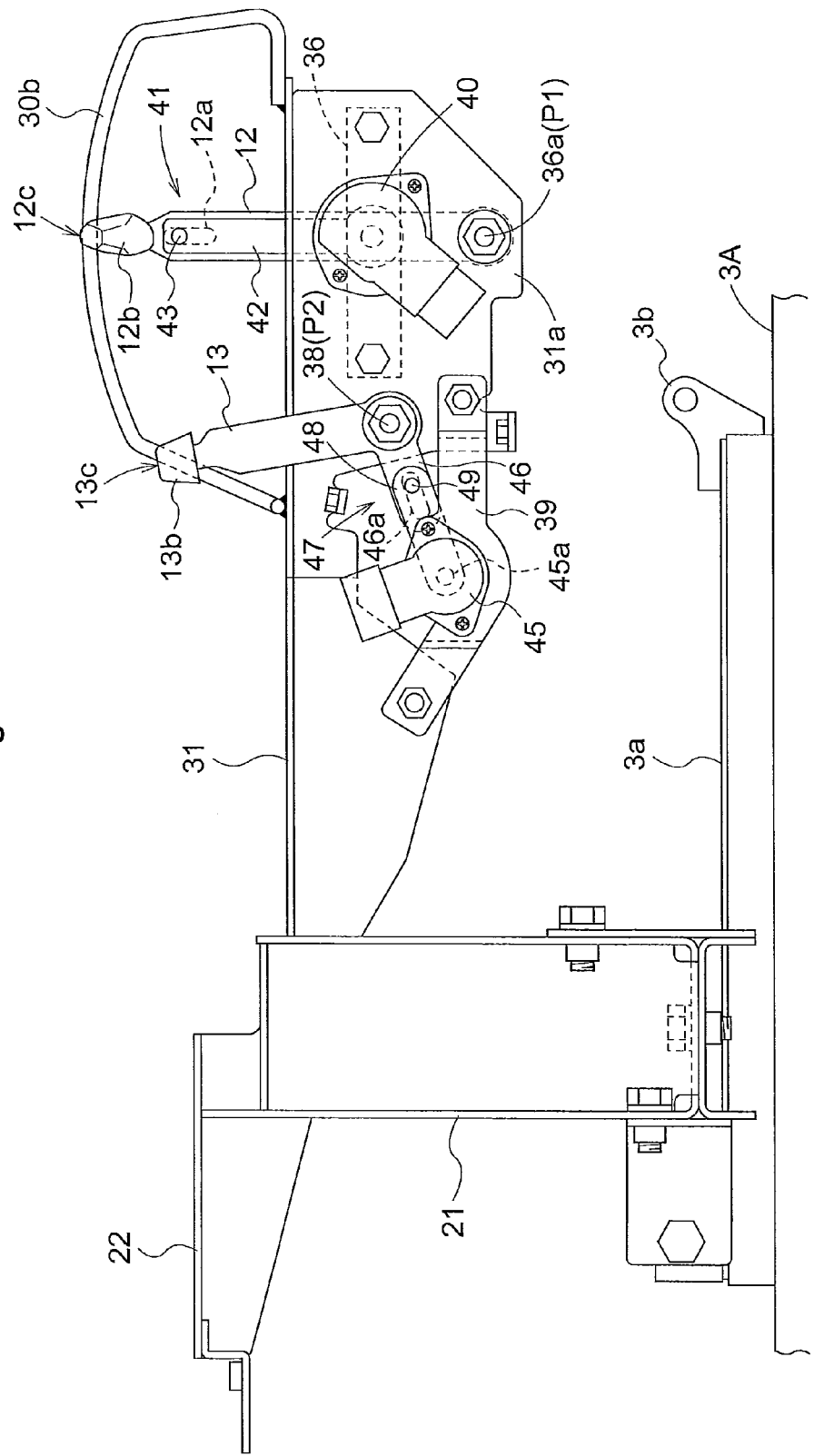
Figure 8:
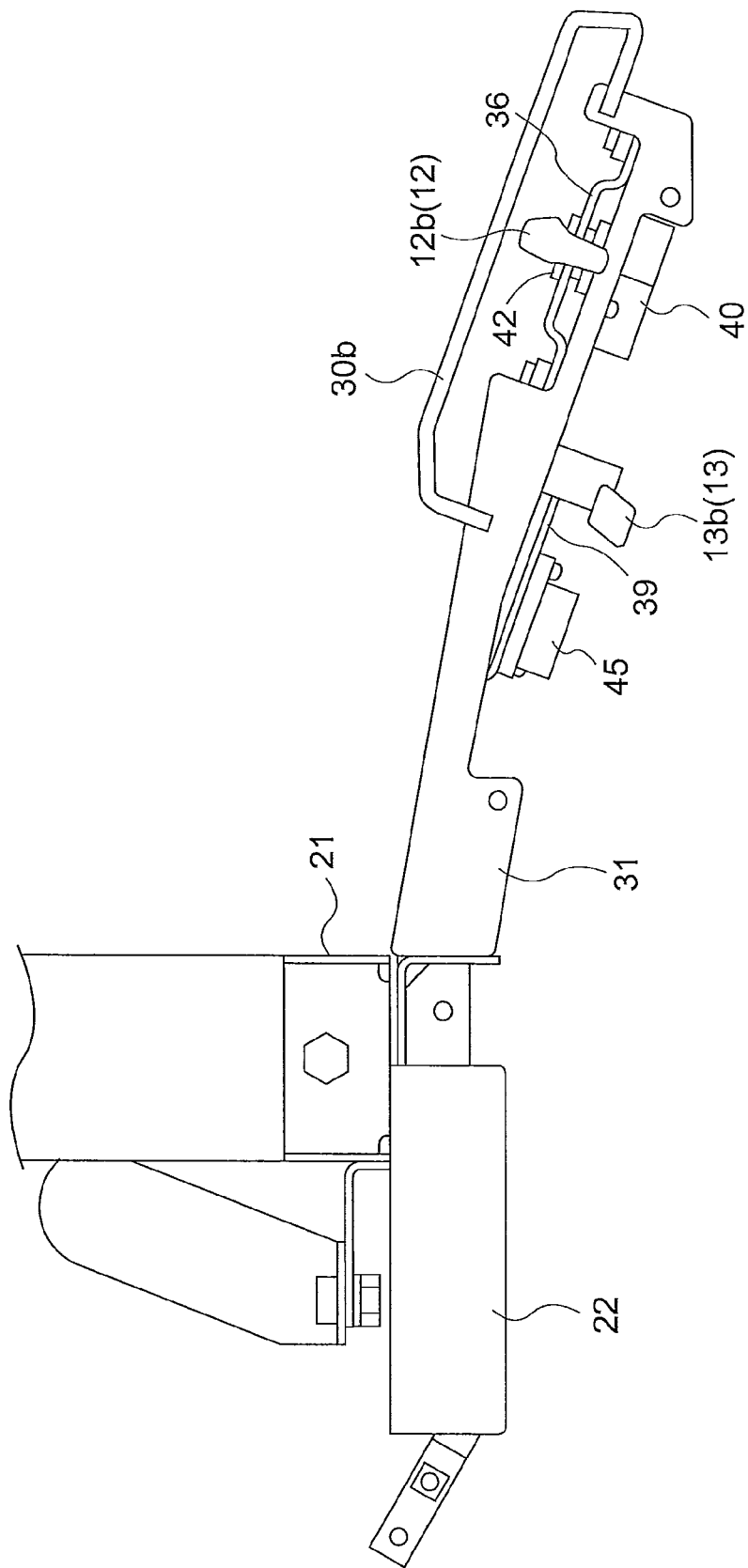
Figure 9:
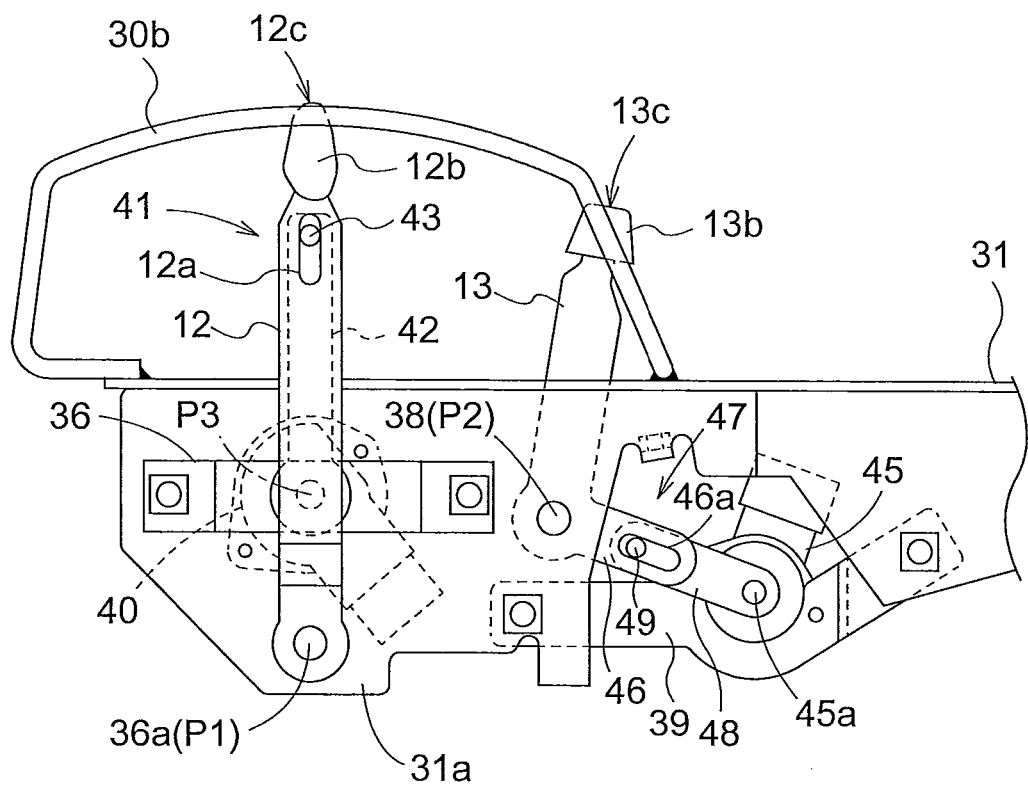

FIG. 7 is a right side view showing constructions of the armrest 20 and the lever supporting structure 30. FIG. 8 is a plan view showing constructions of the armrest 20 and the lever supporting structure 30. FIG. 9 is a left side view showing the construction of the lever supporting structure 30. As shown in these figures as well as in FIGS. 3, 4 and 5, the armrest 20 is comprised of a metal plate member that is supported to an upper portion of a pillar member 21 extending from a seat attaching member 3a provided on the lower face side of the seat of the driver's seat 3 and constituting a base portion 22 of the armrest 20, a resin member supported to the base portion 22 and constituting an exterior portion 23 of the armrest 20, and a resin plate-like member mounted on the upper face of the exterior portion 23 and forming an elbow rest face 24. The exterior portion 23 forms the outer appearance shape of the armrest 20. The seat attaching member 3a is supported to a seat supporting deck 3A of the vehicle body and slidably adjustable in the fore/aft direction. The seat attaching member 3a pivotably supports the front end portion of the seat with its pivotal portion 3b, thus allowing vertical pivotal opening/closing of the driver's seat 3.

The lever supporting structure 30 is comprised of a metal plate member extending forwardly from an upper portion of the pillar member 21 and constituting a base portion 31 of the lever supporting structure 30, and a resin member supported to an inner portion of the base portion 31 and constituting an exterior portion 32 of the lever supporting structure 30. The exterior portion 32 forms the outer appearance shape of the lever supporting structure 30. This exterior portion 32 of the lever supporting structure 30 is comprised of a two-separate part construction consisting of a resin member constituting an upper portion 32a of the exterior portion 32 and a resin member constituting a lower portion 32b of the same. The upper portion 32a of the exterior portion 32 is formed integral with the exterior portion 23 of the armrest 20.

As seen in the plan view of the vehicle body, the lever supporting structure 30 is inclined relative to the armrest 20 in such a manner that the structure is disposed on more transversely outer side of the vehicle body as the structure extends to the front side of the vehicle body. The lower portion 32b of the exterior portion 32 is tapered in its size along the transverse direction of the vehicle body as it extends toward the lower side thereof. Further, a front end portion 30F of the lever supporting structure 30 is tapered in the plan view, so that in spite of the inclination of the lever supporting structure 30 relative to the armrest 20, the lever supporting structure 30 can be readily inserted between the seat of the driver's seat 3 and a rear wheel fender 2F associated with the lever supporting structure 30.

A speed changer lever guide face portion 33 is provided in a vehicle body upper oriented face of the lever supporting structure 30, which face is constituted from a vehicle body upper oriented face of the exterior portion 32, at a position located on the inner side in the transverse direction of the vehicle body. And, a lift lever guide face portion 34 is provided in this vehicle body upper oriented face of the lever supporting structure 30 at a position located on the outer side in the transverse direction of the vehicle body.

In the vehicle body upper oriented face of the lever supporting structure 30 where the lift lever guide face portion 34 is provided, there are provided a forward upwardly oriented face portion 34F located on the front side of the vehicle body relative to the left lever guide face portion 34, a recess portion 34a which separates the forward upwardly oriented face portion 34F and the lift lever guide face portion 34, a rearward upwardly oriented face portion 34R which is located on the rear side of the vehicle body relative to the lift lever guide face portion 34, and a recess portion 34b which separates the rearward upwardly oriented face portion 34R and the lift lever guide face portion 34. The forward upwardly oriented face portion 34F is formed as a flat face located at a substantially same disposing height as the uppermost portion of the lift lever guide face portion 34. The rearward upwardly oriented face portion 34R is formed as a gently sloped face that progressively descends toward the forward side.

The speed changer lever 12 is disposed to extend through a speed changer lever guide groove 35 provided in the speed changer lever guide face portion 33 and extending along the fore/aft direction of the vehicle body and the lever 12 is supported to a support portion 31a provided at the lower end of the base portion 31 of the lever supporting structure 30 via a support shaft 36a to be pivotable about an axis P1. The speed changer lever 12 is operably coupled with a rotary operational shaft of a speed changing potentiometer 40 supported to the base portion 31 via a coupling mechanism 41 having a slot-like coupling hole 12a provided in the speed changer lever 12.

The coupling mechanism 41 for operably coupling the speed changer lever 12 with the speed changing potentiometer 40 includes, in addition to the coupling hole 12a of the speed changer lever 12, a pivotable operational arm 42 operably coupled to the rotary operational shaft of the speed changing potentiometer 40 to be rotatable therewith, and a coupling pin 43 provided in the operational arm 42 to be slidably engageable into the coupling hole 12a of the speed changer lever 12. The operational arm 42 is pivoted to a support portion 36 provided by tapering the base portion 31. A pivot axis P3 of the operational arm 42 is offset relative to the pivot axis P1 of the speed changer lever 12, toward the side where an operational portion 12b of the speed changer lever 12 is located, so that a pivotal operational angle of the speed changer lever 12 is transmitted with amplification thereof to the rotary operational shaft of the speed changing potentiometer 40. As a result, the speed changing potentiometer 40 can detect the operation of the speed changer lever 12 with high precision.

The lift lever 13 is disposed to extend through a lift lever guide groove 37 provided in the lift lever guide face portion 34 and extending parallel with the speed changer lever guide groove 35 and the lever 13 is supported to the base portion 31 of the lever supporting structure 30 via a support shaft 38 to be pivotable about an axis P2. The lift lever 13 is operably coupled with a rotary operational shaft 45a of a lift potentiometer 45 supported to a support portion 39 provided in the base portion 31 with attachment of a stay thereto, via a coupling mechanism 47 having a pivotal arm 46 extending from the base of the lift lever 13 to be pivotable therewith.

The coupling mechanism 47 for operably coupling the lift lever 13 with the lift potentiometer 45 includes, in addition to the pivotal arm 46, an operational arm 48 extending from the rotary operational shaft 45a of the lift potentiometer 45 to be pivotable therewith and a coupling pin 49 provided in the operational arm 48 to be slidably engageable into a slot-like coupling hole 46a provided in the pivotal arm 46.

As shown in FIG. 5, the speed changer lever guide groove 35 and the lift lever guide groove 37 are disposed parallel with each other such that the front end of the lift lever guide groove 37 is rearwardly spaced apart from the front end of the speed changer lever guide groove 35 and the rear end of the lift lever guide groove 37 is rearwardly spaced apart from the rear end of the speed changer lever guide 35. And, the speed changer lever guide groove 35 and the lift lever guide groove 37 are inclined relative to the armrest 20 to be disposed on more outer side in the transverse direction of the vehicle body as the grooves 35, 37 extend to the forward side.

Figure 11:
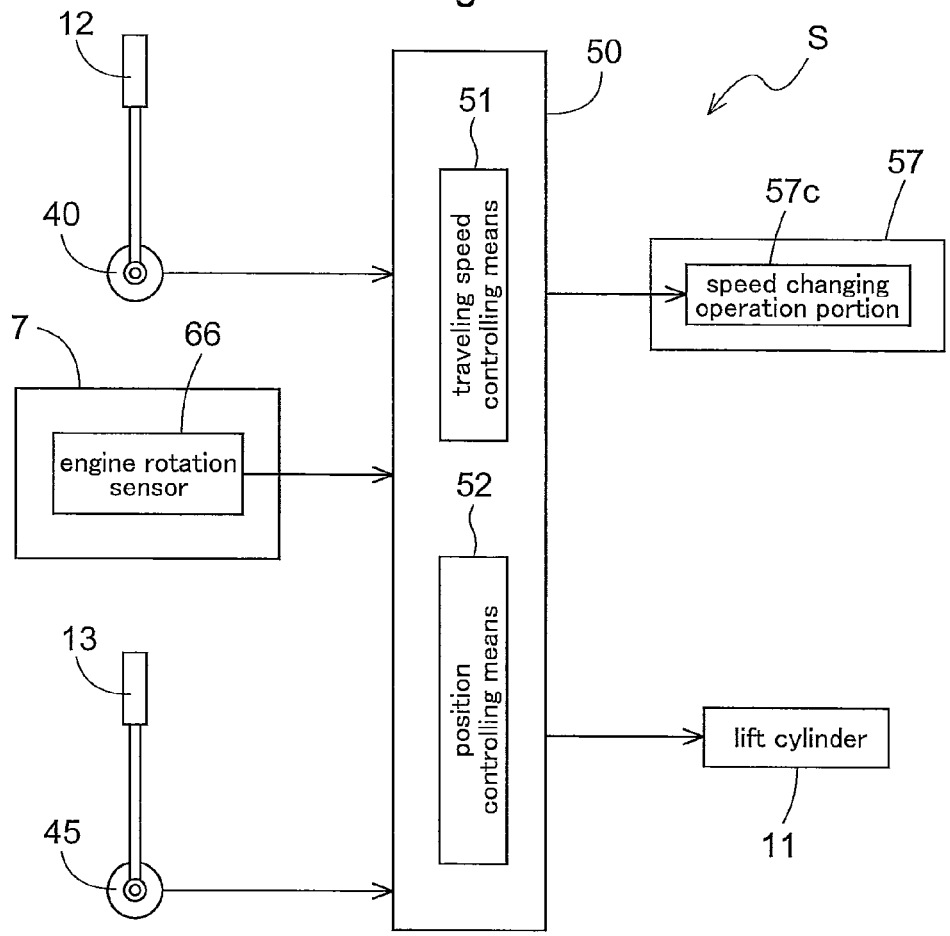

With the control apparatus S in operation, when the speed changer lever 12 is pivotally operated about the axis P1 in the fore/aft direction of the vehicle body along the speed changer lever guide groove 35, the speed changing potentiometer 40 which is operated by the speed changer lever 12 via the coupling mechanism 41 detects this operational position of the speed changer lever 12 and outputs the result of this detection as a speed-changing instruction to a controller 50 shown in FIG. 11. In response to this, traveling speed changing controlling means 51 provided in this controller 50 is activated, so that the traveling speed changing controlling means 51 performs a speed changing control of the transmission unit D such that the traveling speed of the self-propelled vehicle may equal a traveling speed corresponding to the operational position of the speed changer lever 12.

Further, with this control apparatus S in operation, when the lift lever 13 is pivotally operated about the axis P2 in the fore/aft direction of the vehicle body along the lift lever guide groove 37, the lift potentiometer 45 which is operated by the lift lever 13 via the coupling mechanism 47 detects this operational position of the lift lever 13 and outputs the result of this detection as a lifting instruction to the controller 50 shown in FIG. 11. In response to this, position controlling means 52 provided in this controller 50 is activated, so that the position controlling means 52 performs an expansion/contraction control of the lift cylinder 11 such that the coupling height of the rotary cultivator unit 6 may equal a coupling height corresponding to the operational position of the lift lever 13.

As shown in FIG. 3 and FIG. 4, the shape of the speed changer lever guide face portion 33 as seen in the transverse direction of the vehicle body is set as a curved shape convex to the upper side of the vehicle body. As shown in FIG. 6, the shape of the operational portion 12b of the speed changer lever 12 as seen along the fore/aft direction of the vehicle body is set with its lower edge being inclined in the transverse direction of the vehicle body; and the speed changer lever guide face portion 33 has a shape inclined in the transverse direction of the vehicle body such that the face may be located at a lower disposing height as the face extends to the inner side in the transverse direction of the vehicle body, that is, an inclined shape along the moving path of the lower edge of the operational portion 12b.

The shape of the lift lever guide face portion 34 as seen in the transverse direction of the vehicle body is provided as a curved shape convex toward the upper side of the vehicle body so as to extend along the operational pathway of the operational portion 13b formed at the upper end of the lift lever 13 with attachment of resin block.

The one dot chain line A shown in FIG. 3 indicates the disposing height of the speed changer lever guide face portion 33 at the uppermost position thereof. The one dot chain line B shown in FIG. 3 indicates the disposing height of the lift lever guide face portion 34 at the uppermost position thereof. As shown in this FIG. 3, the lift lever guide face portion 34, along the entirety of this lift lever guide face portion 34, is arranged at a disposing height lower than the speed changer lever guide face portion 33. A predetermined disposing height difference is provided between the lift lever 13 and the speed changer lever 12 such that an upper end 13c of the operational portion 13b of the lift lever 13 may be located at a lower disposing height than an upper end 12c of the operational portion 12b of the speed changer lever 12. With this arrangement, when the speed changer lever 12 is operated, the operator's hand on the speed changer lever 12 can be comfortably placed upwardly of the lift lever 13, thus restricting obstruction of the operation from the lift lever 13.

The speed changer lever guide face portion 33 is disposed at a slightly lower disposing height than the upper place formed by the elbow resting face 24 of the armrest 20. At a portion of the lever supporting structure 30 between the speed changer lever guide face portion 33 and the armrest 20, there is provided a recess portion 30a that is open to the upper side of the vehicle body and has its bottom formed at a disposing height lower than the upper face formed of the elbow resting face 24 of the armrest 20 and the speed changer lever guide face portion 33.

On the inner side in the transverse direction of the vehicle body of an operational pathway R of the operational portion 12b of the speed changer lever 12, there is provided a speed changer lever guard body 30b for preventing contact between an operator's body and the speed changer lever 12 when the operator is getting seated or leaving the driver's seat 3. This guard body 30b is constituted from a bent elongate rod having an intermediate length portion thereof formed along the operational pathway R of the operational portion 12b of the speed changer lever 12 so that its opposed ends may be connected to the base portion 31 of the lever supporting structure 30.

Next, the transmission unit D for effecting speed changing operations will be described in details.

Figure 10:
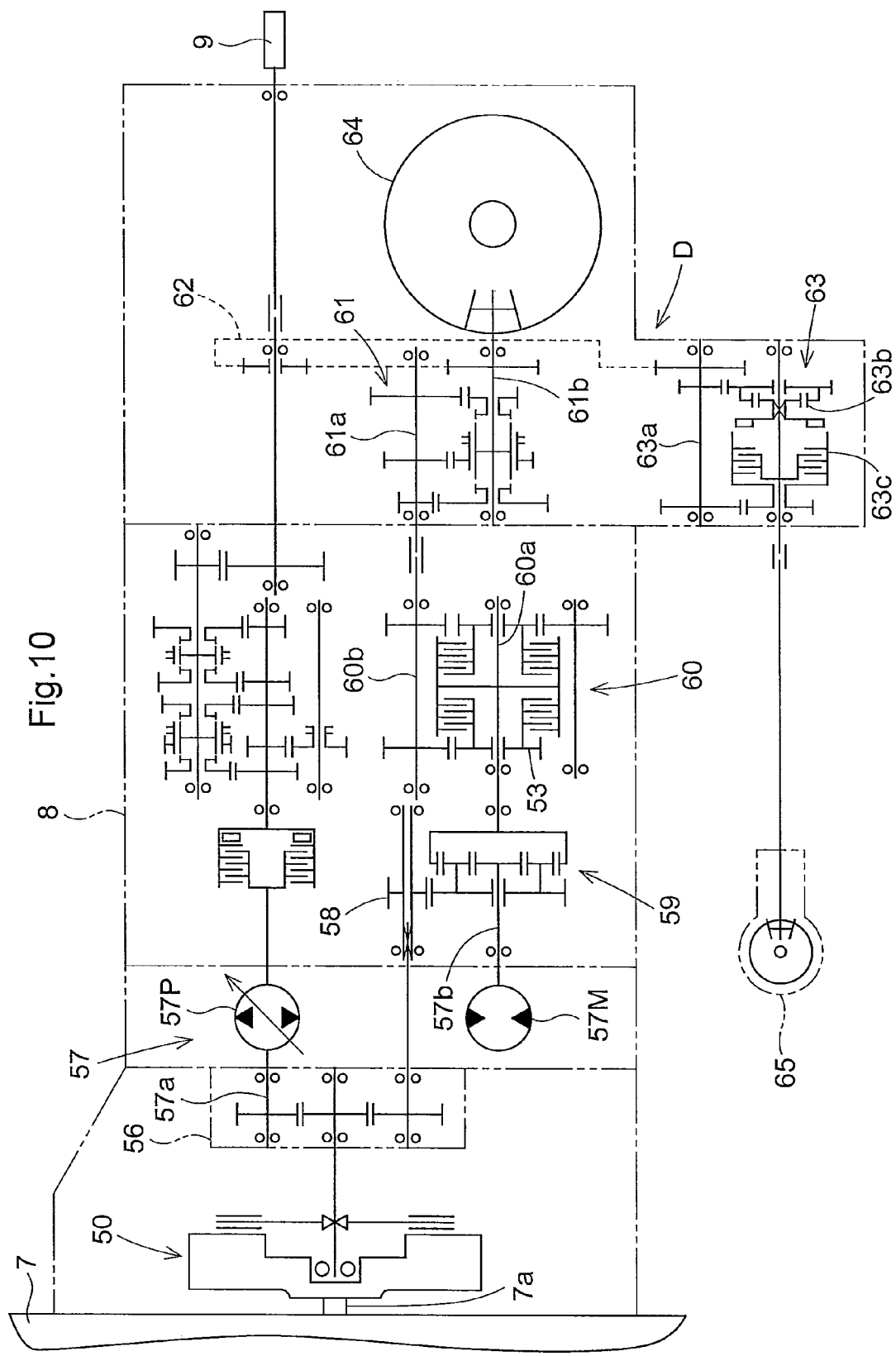

FIG. 10 is a skeleton view showing the transmission unit D. As shown in this figure, the transmission unit D includes: a hydrostatic speed changing mechanism 57 in which a pump shaft 57a of a hydraulic pump 57P is operably connected to an output shaft 7a of the engine 7 through a main clutch mechanism 50 and a distributing mechanism 56; a planetary transmission mechanism 59 having a carrier operably connected to the output shaft 7a of the engine 7 via the main clutch mechanism 50, the distributing mechanism 56 and a power input gear 58 and having a sun gear operably connected to a motor shaft 57b of a hydraulic motor 57M constituting the hydrostatic stepless speed changing mechanism 57; a forward/reverse switchover mechanism 60 having an input shaft 60a operably connected to a ring gear of the planetary transmission mechanism 59; an auxiliary speed changing mechanism 61 having an input shaft 61a operably connected to an output shaft 60b of the forward/reverse switchover mechanism 60; and a front wheel speed changing mechanism 63 having an input shaft 63a operably connected to an output shaft 61b of the auxiliary speed changing mechanism 61 through a gear connecting mechanism 62.

With the transmission unit D in operation, an output from the hydrostatic stepless speed changing mechanism 57 driven by a drive force from the engine 7 and the drive force from the engine 7 are synthesized through the planetary transmission mechanism 59, and the drive force outputted from the planetary transmission mechanism 59 is transmitted via the forward/reverse switchover mechanism 60 to the auxiliary speed changing mechanism 61 and the force from this auxiliary speed changing mechanism 61 is transmitted to a rear wheel differential mechanism 64 and a front wheel speed changing mechanism 63. The front wheel speed changing mechanism 63 is speed-changed to a constant speed condition and an accelerated transmission condition, in response to switchover operations of a constant speed clutch 63b and an acceleration clutch 63c. The front wheel speed changing mechanism 63, when speed-changed to the constant speed transmission condition, transmits force to the front wheel differential mechanism 65 for driving the pair of right/left front wheels 1, 1 such that the average peripheral velocity of the front wheels 1, 1 and the average peripheral velocity of the pair of right/left rear wheels 2, 2 equal each other. The front wheel speed changing mechanism 63, when speed-changed to the accelerated transmission condition, transmits the force to the front wheel differential mechanism 65 for driving the front wheels 1 such that the average peripheral velocity of the front wheels 1, 1 is higher that the average peripheral velocity of the pair of right/left rear wheels 2, 2.

As shown in FIG. 11, a speed changing operation portion 57c provided in the hydrostatic stepless speed changing mechanism 57 is operably connected to the controller 50 for effecting swash angle changes of the hydraulic pump 57P in the hydrostatic stepless speed changing mechanism 57, and an engine rotation sensor 66 provided in the engine 7 is also operably connected to the controller 50 for detecting an output rotational speed of the engine 7. The hydrostatic stepless speed changing mechanism 57 has its speed-changing operations controlled by the speed changing controlling means 51 which operates based on detection information from the speed changing potentiometer 40 and the engine rotation sensor 66.

That is, with the transmission unit D in operation, when the accelerator is set to cause the engine 7 to output a drive force at a constant speed, if the hydrostatic stepless speed changing mechanism 57 is speed-changed from a highest speed position in the reverse rotation transmitting condition to a highest speed position in the forward rotation transmitting condition, the forward traveling vehicle speed and the reverse traveling vehicle speed of the self-propelled vehicle are accelerated in a stepless manner from the zero speed. When the hydrostatic stepless speed changing mechanism 57 reaches the highest speed position in the forward rotation transmitting condition, the forward traveling vehicle speed and the reverse traveling vehicle speed are rendered to the maximum speeds.

[Second Embodiment]

Figure 12:
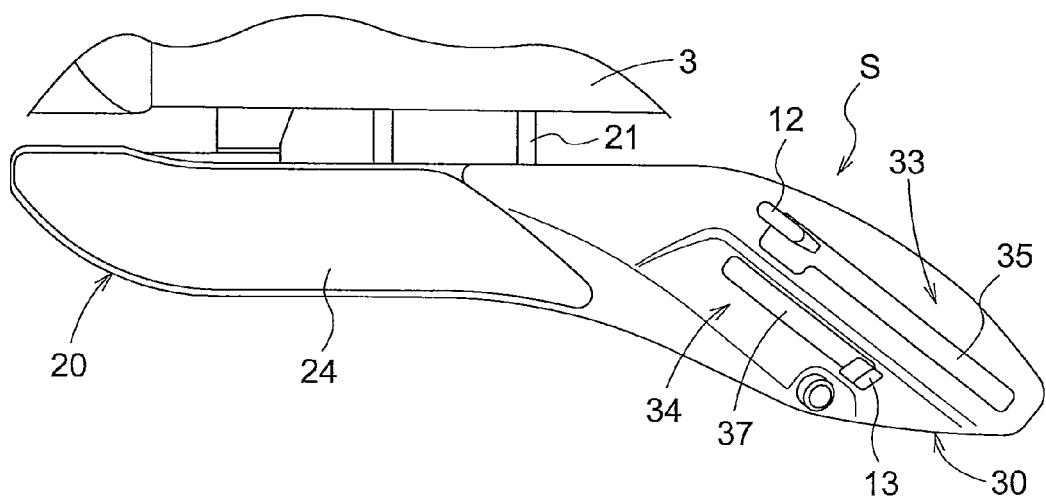
Figure 13:
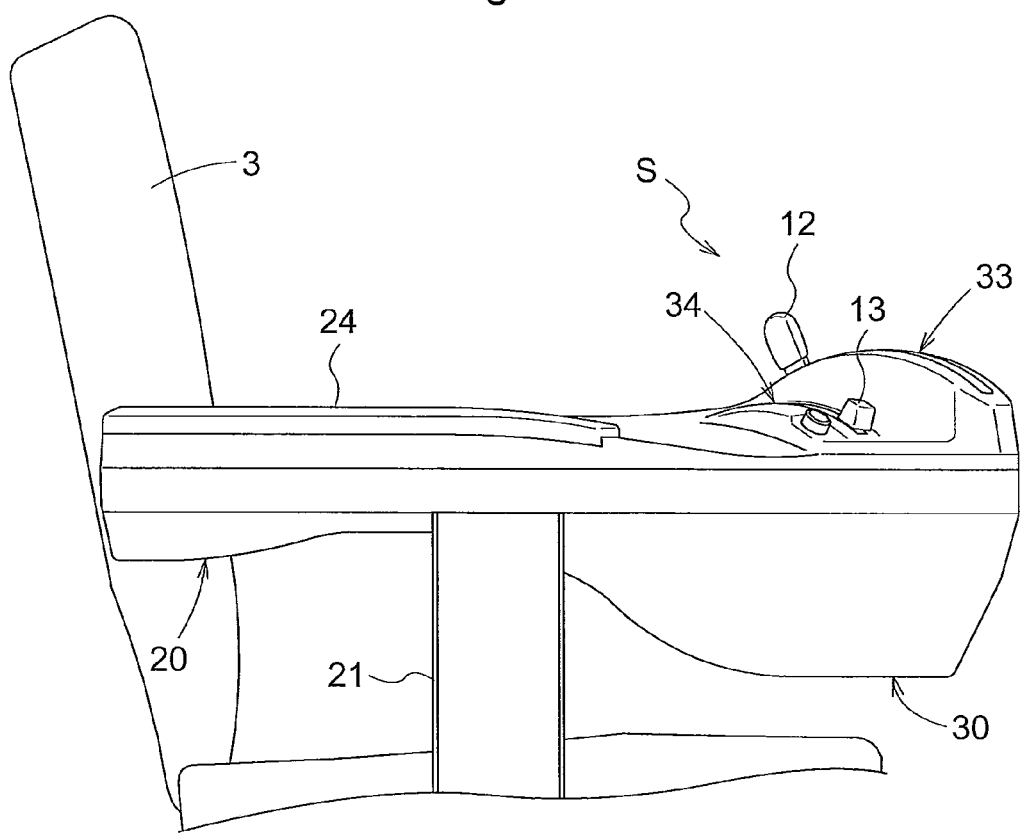

FIG. 12 and FIG. 13 are a plan view and a side view both showing a control apparatus S in its entirety of a work vehicle according to a second embodiment. With this control apparatus S, the speed changer lever guide groove 35 and the lift lever guide groove 37 are formed parallel with each other such that the position of the rear end of the speed changer lever guide groove 35 in the fore/aft direction of the vehicle body is in substantial agreement with the position of the rear end of the lift lever guide groove 37 in the fore/aft direction of the vehicle body.

Further, with this control apparatus S, the speed changer lever guide face portion 33 and the lift lever guide face portion 34 are set at higher disposing heights than the upper face 24 of the armrest 20.

[Other Embodiments]

(1) In the foregoing embodiments, the shapes of the speed changer lever guide face portion 33 and the lift lever guide face portion 34 in the transverse direction of the vehicle body are curved faces convexed to the upper side of the vehicle body. Instead of this, the invention may be embodied with the shapes of the speed changer lever guide face portion 33 and the lift lever guide face portion 34 in the transverse direction of the vehicle body being flat shapes.

(2) In the foregoing embodiments, the armrest 20 and the lever supporting structure 30 are disposed on the right lateral side of the driver's seat 3. Instead, these can be disposed on the left lateral side of the driver's seat 3.

(3) The present invention is applicable not only to a work vehicle having a rotary cultivator unit at a rear portion of the vehicle body, but also to other work vehicles in which various utility implements are connected to the rear portion of the vehicle body or various utility implements such as a grass mower unit are connected to a front portion of the vehicle body or between the front and rear wheels to be lifted up/down.

What is claimed is:

1. A work vehicle having a self-propelled vehicle body to which an implement is connectable, the work vehicle comprising:
a driver's seat;
an armrest disposed laterally of the driver's seat;
a lever supporting structure extending from a front end of the armrest to a forward side of the vehicle body;
a speed changer lever for a traveling speed changing operation of the self-propelled vehicle body, the speed changer lever being supported to the lever supporting structure to be pivotable back and forth;
a lift lever for lifting up/down the implement, the lift lever being supported to the lever supporting structure to be pivotable back and forth;
a speed changer lever guide face portion provided at a transversely inner portion of an upwardly oriented face of said lever supporting structure, said speed changer lever guide face portion having a speed changer lever guide groove for the speed changer lever; and
a lift lever guide face portion provided at a transversely outer portion of the upwardly oriented face of said lever supporting structure, said speed lift lever guide face portion having a lift lever guide groove for the lift lever;
wherein:
a stepped portion is provided at a portion of said lever supporting structure between said speed changer lever guide face portion and said lift lever guide face portion to extend continuously with said speed changer lever guide face portion and said lift lever guide face portion, said stepped portion extending in a lengthwise direction of said speed changer lever guide face portion and said lift lever guide face portion, such that said lift lever guide face portion is set at a disposing height lower than said speed changer lever guide face portion;
an upper end of said lift lever is set at a disposing height lower than an upper end of said speed changer lever; and
said speed changer lever guide groove and said lift lever guide groove are disposed parallel to each other.

2. The work vehicle according to claim 1, wherein the speed changer lever guide face portion is set at a lower disposing height than an upper face of the armrest.

3. The work vehicle according to claim 1, further comprising a guard body for the speed changer lever provided on a transversely inner side of an operational pathway of the speed changer lever.

* * * * *

UNITED STATES PATENT AND TRADEMARK OFFICE
CERTIFICATE OF CORRECTION

PATENT NO.        : 8,579,070 B2                         Page 1 of 1
APPLICATION NO.   : 13/051674
DATED             : November 12, 2013
INVENTOR(S)       : Keishiro Nishi et al.

It is certified that error appears in the above-identified patent and that said Letters Patent is hereby corrected as shown below:

Title Page

Column 2, Item (57) Abstract, Line 3, delete "eat" and insert -- seat --

Column 2, Item (57) Abstract, Line 8, delete "ever" and insert -- lever --

Signed and Sealed this
Fourth Day of March, 2014

Michelle K. Lee
*Deputy Director of the United States Patent and Trademark Office*